Sept. 6, 1927. 1,641,527
R. W. A. BREWER
FUEL MANIFOLD
Filed Aug. 18, 1924
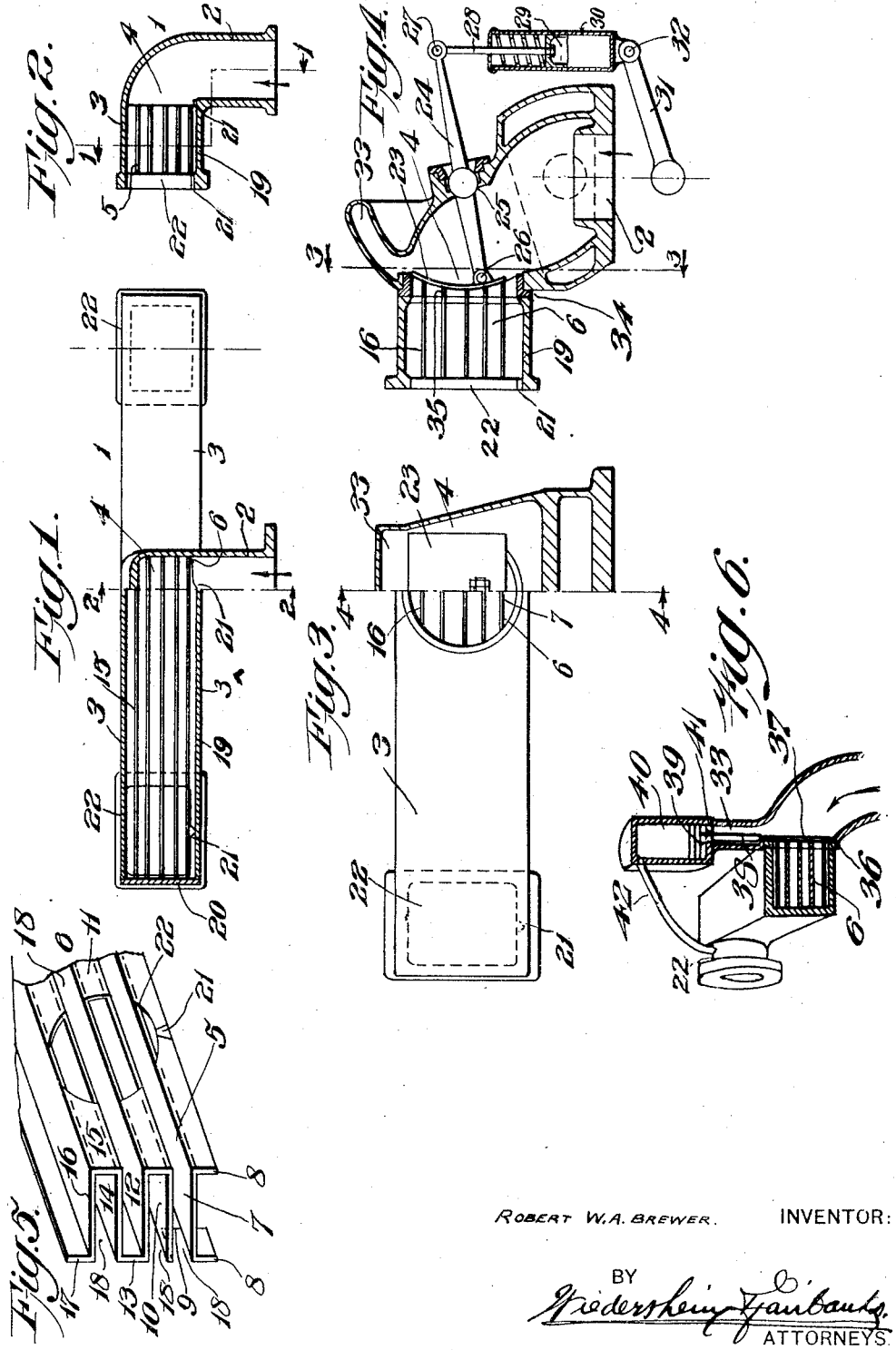
ROBERT W. A. BREWER. INVENTOR
BY
ATTORNEYS Patented Sept. 6, 1927.

1,641,527

UNITED STATES PATENT OFFICE.

ROBERT W. A. BREWER, OF PHILADELPHIA, PENNSYLVANIA.

FUEL MANIFOLD.

Application filed August 18, 1924. Serial No. 732,665.

This invention relates to improved means for bringing the air stream into contact with such part of the fuel which precipitates in the manifold and to means for regulating the flow of air in direction and velocity through the manifold.

Prior to my present invention any liquid fuel which precipitated from a mixture with air, either fell to the floor of the manifold or clung to the walls, in a manner so as to form puddles or aggregations of drops. The liquid in this state surged in an erratic manner inside the manifold due to the action of turbulence of the air. The liquid also was only influenced by such a small portion of the total air passing through the manifold as came within close proximity to it.

The object of this invention is to divide the precipitated liquid into a number of thin layers, each layer of liquid being passed over by a comparatively thin layer of air. In this manner a greater total wetted surface is presented to the air stream and the active surfaces between air and fuel thereby increased in total area.

A further object of my invention is to control the number of laminations or cells of air and fuel which are interactive by shutting off the passages as may be required so as to permit flow through the active passages to be maintained at or near any predetermined velocity.

The object of velocity control is to maintain the speed of the air along a wetted surface at or above such a magnitude as will cause the liquid to be picked up from that surface and carried in suspension. As an indication, such an air speed will be approximately 35 feet per second as a minimum.

A further object of my invention is to provide a sufficient number of direct laminated passages, so that the maximum volumetric efficiency of the engine can be obtained at full power output.

With any manifold of fixed sectional area prior to my invention it was not possible to provide such a sectional area as will meet the desired conditions of maximum and minimum engine demand. If the sectional area of the manifold was sufficiently large to enable engines to develop a reasonable volumetric efficiency, the major portion of the air passing through the manifold did not go into close proximity with wetted surfaces of the manifold walls; present day motor fuels do not vaporize readily, and it is well known that a large percentage of the liquid is not vaporized until after it has reached the inlet manifold. In order to effect vaporization it has been customary to apply heat to those surfaces upon which the liquid precipitates. This practice in certain circumstances is liable to raise the temperature of the whole mixture to such an extent that when the explosive mixture has been introduced to the engine cylinders, its final temperature is higher than is desired to insure stable operative conditions and detonation results. In order that such a high temperature should not be reached, my present invention employs an alternative method of vaporizing the liquid which is by means of scrubbing or agitation of the liquid by the air; in order to effect the object aimed at, I direct the air stream as closely as convenient over the surface of the liquid, which lies precipitated on the shelves or laminations of the manifold shown in this invention, by dividing the air stream into numerous thin layers, and by distributing the liquid on to numerous shelves as it enters the manifold practically the whole of the air stream being brought into close proximity to precipitated liquid. In the prior art, the bulk of the air stream was at such a distance from the liquid that its effect as a fuel carrier was minimized, further owing to uncontrolled turbulence of such a considerable mass of air it was not possible to direct with certainty the flow of liquid fuel equally into the several branches of the manifold. In my present invention the turbulence of the air is divided into comparatively thin laminations. Some adjustment is therefore possible in my invention by varying the width of the laminations and their location according to the general tendency of the fuel stream to separate out under varying operative conditions. Such a simple method of adjustment as the variation of the spacing of the strips is a valueable feature in enabling any one general design to be modified to suit many conditions of operation of the motor.

A further object of my invention is to control the operative cross sectional area of the manifold in accordance with the amount of air flowing through the carburetor by means which provide a lag in operation, so that a better pick up of the engine is secured by an initial restriction of effective area of the manifold, when the carburetor throttle is suddenly opened.

For the purpose of illustrating my invention, I have shown in the accompanying drawings forms thereof which are at present preferred by me, since they will give in practice satisfactory and reliable results, although it is to be understood that the various instrumentalities of which my invention consists can be variously arranged and organized and that my invention is not limited to the precise arrangement and organization of these instrumentalities as herein shown and described.

Fig. 1 represents a sectional elevation of a fuel manifold embodying my invention, the left half being partly on line 1—1 of Fig. 2, the manifold having two outlet ports and showing one embodiment of my invention.

Fig. 2 represents a vertical section on line 2—2 of Fig. 1, including also one outlet port.

Fig. 3 is a part section through the line 3—3 of Fig. 4 and part elevation of an inlet manifold having two outlet ports and novel controlling mechanism for the air and fuel flow the left hand portion of the figure being in elevation to illustrate the manifold with the regulator removed; and the right hand side of the figure being in section when taken through the regulator on the line 3—3 of Fig. 4.

Fig. 4 is a section through the center of Fig. 3 on line 4—4 of Fig. 3 showing one method of connecting the controlling mechanism to the throttle lever of the carburetor.

Fig. 5 represents a perspective view of the laminated core removed.

Fig. 6 represents a side elevation partly in section of a modification of the control seen in Fig. 4. Similar numerals of reference indicate corresponding parts in the figures.

Referring first to Figs. 1 and 2, 1 designates my novel fuel manifold, comprising the receiving passage 2, preferably flanged at one end for convenient attachment to any conventional carburetor (not shown) said receiving passage communicating with the laterally extending branches 3, through the side entry port 4. The branches 3 conjoin at the entry ports 4, and the chambers therein are divided into lateral sections by the division strips or shelves 5 which pass along the axis of the core 6 and across the entry port 4 which may be provided with a suitable partitioned valve seat 34. This valve seat 34 is provided with a plurality of horizontally disposed short partitions 35 which register and align with the ends of the juxtaposed horizontal partitions of the core seen in Fig. 5. The core 6, one form of whose construction will be understood from Fig. 5, is preferably composed of the bottom strip or shelf 7 from which depend the bottom flanges or feet 8, which support said core in position. From the strip 7, extends the upright wall 9, from which extends the lateral wall 10, upright wall 11, lateral wall 12, upright wall 13, lateral wall 14, upright wall 15, lateral wall 16 and top flange 17. By this construction a series of laterally extending, superimposed chambers 18 are formed, which extend throughout the branches 3, and across the inlet port 4. With the type of construction shown in Fig. 5 portions of vertical walls of the core 8, 11 and 15 are cut away where they register with ports on that side of the manifold, so as to give free entry of the gases between the shelves which would otherwise be blanked off. The other side of the manifold portions of the vertical walls are similarly cut away where they come opposite to entry of the inlet ports. It will be apparent that the division strips or shelves are positioned at varying distances from the floor 19 of the manifold, to catch the particles of liquid fuel, which enter from the port 4, and as the drops of fuel are diffused in the entering air stream, the liquid will precipitate on those shelves or strips, which are in communication with the air stream. The core 6 can be inserted in the branches 3 by any suitable means but I preferably provide the removable head or closure 20, seen at the left of Fig. 1. Upon the removal of this head, the core 6 can be readily slid into position as seen in Fig. 1, and the head 20 is then placed in position and permanently secured by spot welding, arc welding, brazing or other suitable means, the finished manifold appearing as seen in Figs. 1 and 2, so that the core will be held from vertical or lateral shifting. 21 designates small drainage grooves in the sills of the exit and entry ports 22 and 4, whereby the fuel is conducted to the engine cylinders. It will be understood that the number of shelves or strips 7, 10, 12, 14, and 16, as well as the number of the superimposed chambers may be increased or diminished according to requirements. Fig. 5 indicates one convenient method of manufacturing these shelves which form the laminated section. They may, however, be built up by any convenient means which includes the location and spacing of a series of ledges or shelves of any convenient shape which will hold the liquid fuel away from the main floor of the manifold.

In Figs. 3 and 4, I have shown an intake manifold having installed therein a core 6 of the character already described, whereby the cellular construction seen is attained, but I employ a controlling valve 23 movable across a seat 34 interposed between the outlet from the carburetor and at the side entry port 4, which directs the flow of the fuel and air mixture between one or more of the pairs of shelves or division strips, in accordance with the amount of the valve opening:

For example, when the demand of the engine for fuel is small the valve can be opened a small amount, so that the effective area through the manifold is that of one section only, and consequently the velocity of the air through this section is maintained at a sufficiently high degree to pick up the fuel from the wetted surfaces with which it comes in contact. During the actuation of the valve any desired number of sections of the manifold can be made operative so that a sufficient number can be caused to function, so as to hold the air velocity within a desirable maximum degree. By this means a maximum volumetric efficiency of the manifold system can be obtained.

The valve 23, is operated by the lever 24, fulcrumed at 25, the inner end of said lever being pivotally connected at 26 to said valve, and its outer end being pivoted at 27 to the rod 28 attached to the spring pressed plunger 29 mounted in the cylinder 30 which plunger and piston act as a retarding mechanism or dash pot in the movement of the actuating lever 31 applied to lever 24 operating the valve 23. 31 designates the throttle arm of the carburetor (not shown) which is pivotally connected to the retarding mechanism at the pin 32.

Alternatively, the plunger 39 can be actuated by differences of pressure existing between the regions 33 and 22, which difference of pressure is a function of the velocity of the air through the laminated passages. The auxiliary device in Fig. 4 which is indicated by numerals 28, 29, and 30, is to provide a small lag of time between the operation of the carburetor control and the movement of the valve 26 so that the engine will be able to pick up its speed more rapidly when the throttle is suddenly opened because the temporary constriction of the manifold causes a high air speed through the lower sections thereof which serves to pick up liquid fuel which may have precipitated thereon. This conjoined action is obviously similar in its function to a temporary or auxiliary fuel supply such as is provided in certain carbureting devices which come into operation when the throttle valve is suddenly opened.

As one of the main principles on which this invention operates is velocity of air through these passages, it being by reason of this velocity and the turbulence created that the fuel is picked up from the wetted surface, the control of the apparatus by means of this velocity is conveniently carried out in the following manner: The valve 23 of any convenient shape is interposed between the inlet to the manifold and the laminated passages and works against a seat 34, the apertures of which correspond with the spaces between the shelves of the manifold. The valve is operated by means of a piston to which it is directly attached, and as the piston moves in its cylinder, so it opens and closes the valve. As the velocity of air through the manifold depends upon the difference of absolute pressure at the two ends of the passage through which the air flows, the difference in pressure at these two points forms an exact method of controlling the movement of the piston in accordance with the desired velocity. As the pressure in the region 33 is always greater than that in the region 22, and as it is desired to maintain some predetermined pressure difference between these two points, it is convenient that communication be made between the region 22 and that part of the cylinder which is remote from the valve, so that when the drop of pressure in the region 22 becomes excessive, the pressure below the piston which is connected to region 33 causes the piston to rise and the valve to be opened thus increasing the sectional area through which the air and fuel must pass to the engine, as shown in Fig. 6.

In the construction seen in Fig. 6, I have shown the valve seat 36 as being provided with a rectilinear wall, so that the valve 37 instead of moving in a curvilinear path as seen in Fig. 4, moves in a rectilinear path. The valve 37 is provided with a valve stem 38, whose upper end is connected to the plunger 39 mounted in the cylinder 40. In the lower part of the cylinder is a passageway 41 communicating with the region 33 and in the upper part of the cylinder 40 is a pipe 42 connecting with the region 22. By means of the devices the pressure is communicated to the two sides of the piston 39. In both of the embodiments of my invention, seen in Figs. 4 and 6, it will be seen that provision is made for regulating at will the number of the shelves or laminations which it is desired shall function. It will now be apparent that I have devised a novel and useful construction of fuel manifold which embodies the features of advantage enumerated as desirable in the statement of the invention and the above description, and while I have in the present instance, shown and described preferred embodiments thereof, which will be found in practice to give satisfactory and reliable results, it is to be understood that the same is susceptible of modification in various particulars without departing from the spirit or scope of the invention or sacrificing any of its advantages.

While this type of construction depends to a great extent upon the air velocity across large areas of wetted surfaces, and the proximity of the air stream to the liquid and to controlled turbulence of the air to affect the object of completion of carburetion, it may be advisable to heat portions or all of the metallic surfaces and the incoming air stream. Suitable methods of carrying this into effect are described in my United States Patents 1,456,176 and 1,476,281, and Fig. 4 shows one such application.

Having thus described my invention what I claim as new and desire to secure by Letters Patent, is:—

1. An inlet manifold for an internal combustion engine comprising a series of continuous unbroken shallow chambers of the same length and width extending longitudinally and transversely of said manifold the latter having side inlets and outlets, said inlets being controlled by a valve which is slidable over the inlet opening, said valve being connected to the throttle operating mechanism by means, comprising a link work containing devices for imparting motion thereto.

2. An inlet manifold for a multi-cylinder engine comprising an outer casing, a core therein composed of a plurality of parallel continuous shelves of the same length and width, disposed within said casing throughout the total length and width thereof, and openings at the sides of said casing communicating with all of the spaces between said shelves, one opening being controlled by a sliding valve mechanism controlling the gas flow from the carburetor connected to said valve and a cushioning device interposed between said mechanism and valve.

3. An inlet manifold for a multi-cylinder engine comprising an outer casing, a plurality of continuous unbroken shelves of the same length and width disposed within said casing throughout the total length and width thereof, and openings at the sides of said casing communicating with all of the spaces between said shelves, one opening being controlled by a sliding valve operated by a piston controlled by a spring and a dashpot in an enveloping casing, said casing being connected to the carburetor throttle controlling means.

ROBERT W. A. BREWER.